March 6, 1951  J. P. SMITH  2,544,054
VALVE STRUCTURE AND SYSTEM THEREFOR
Filed Dec. 2, 1946

Inventor
Judson P. Smith
by W. Bartlett Jones
Attorney

Patented Mar. 6, 1951

2,544,054

UNITED STATES PATENT OFFICE 2,544,054

VALVE STRUCTURE AND SYSTEM THEREFOR

Judson P. Smith, Cloquet, Minn., assignor to Wood Conversion Company, St. Paul, Minn., a corporation of Delaware Application December 2, 1946, Serial No. 713,603

10 Claims. (Cl. 302—17)

The present invention relates to systems for pneumatically conveying and depositing solid materials suspended in gas, and in particular to valve means for conduits in such a system.

Recently, systems have been developed for pneumatically packing insulating material, such as fiber, into insulating spaces, exemplified by refrigerator cabinets. The systems referred to have been developed for use in assembly-line manufacturing operations wherein cabinets, or doors therefor, to be filled, move in succession past a filling station. In such operations the cabinet or other article to receive particles, such as insulating fiber, is arrested at the station for and during the filling operation. Such systems commonly operate with a fan-type blower in continuous operation, and the control of flow in the conduits associated with the blower is effected by one or more valve means. Where a filling cycle lasts for only a short time, for example, a minute or more, a continuous line of operation calls for many operations of the valve. As a consequence, it is most desirable that the valve be maintained clean and its operation not be impeded by undesired accumulation of solids to prevent perfect closure of the valve or to render its operation inaccurate or difficult.

The present invention provides a system having a self-cleaning valve and also for operation of such a valve in such a system.

It is an object of the present invention to provide a cut-off valve arranged to receive a supply of suitable gas to its casing for cleaning out the valve.

It is a particular object of the present invention to provide a gate valve movable in a casing having a chambered space communicating with the valve opening in the opened-gate position, and to superimpose upon the flow through the open valve a valve-cleaning flow from the said chambered space into the valve opening.

It is also an object of the invention to provide means for opening and closing a valve, and to associate with said means a supply of gas to clean the valve during its open condition.

Various other objects and advantages of the invention will become apparent from the following description and explanation of the invention as it is preferably embodied in the apparatus shown in the accompanying drawings.

Figure 1:
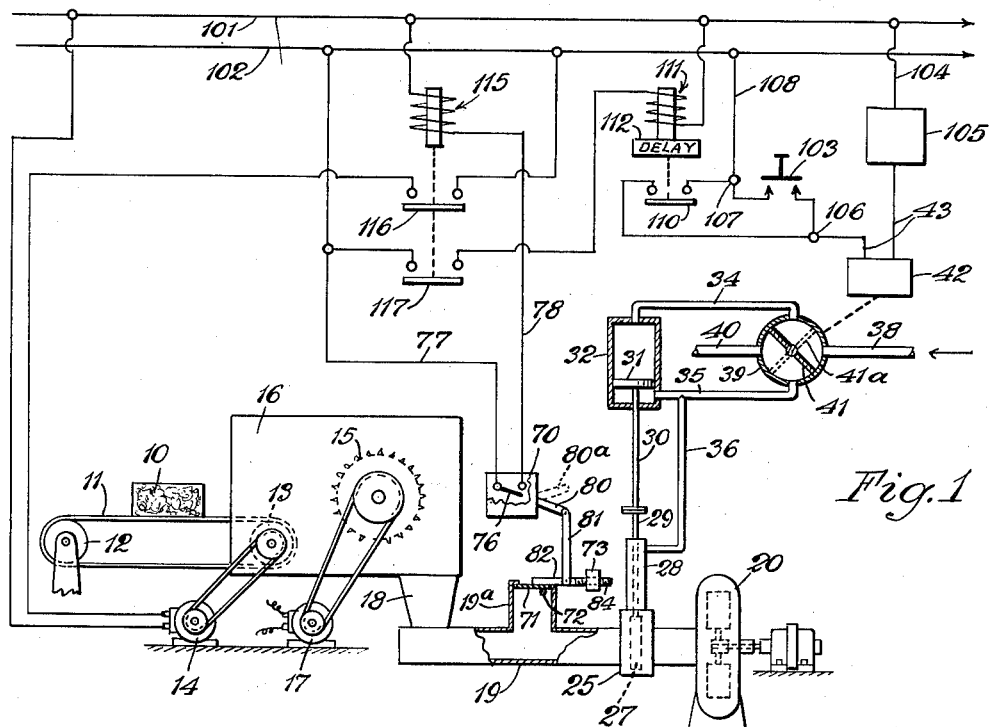
Fig. 1 shows a portion of a system for suspending fibers in air and for conveying the suspension to a depositing station where the fiber is deposited as an insulating body in a confined space.

It is to be understood that the present invention is not limited to use in systems for depositing fiber as insulation. It will be obvious from the explanation of its use in such a system, that the invention may be applied in other fields where solid material is conveyed through a cut-off valve in any conveying system as a suspension in a gaseous medium.

In the drawing the numeral 10 represents an opened previously-wired bale of fiber resting on an endless belt conveyor 11 operating over the pulleys 12 and 13, one of which is suitably driven, as by the electric motive means 14. The belt 11 travels slowly in order gradually to feed the bale 10 to a bale-breaking device, such as a rotor 15 within a housing 16. The rotor 15 is operated by power means 17. The bale-breaking means 15 is effective to disintegrate the compacted fiber of bale 10 into a loose and fluffy form which is discharged from the housing 16 through outlet 18 opening into an intake conduit 19 of a fan blower 20. The arrangement of the foregoing parts is such that both the blower 20 and the rotor 15 may operate continuously so that by arresting the travel of the conveyer 11 and the bale 10 into the housing 16, the feeding of fluffed fiber to the blower 20 is arrested. Since the system involves means to stop the feeding of the fiber or like material, it is preferred to have such means operate upon the electric motive means 14 to arrest the feeding mechanism. This control will be later described.

The fan blower 20 discharges centrifugally, and as shown, discharges preferably downwardly from the blower through conduit 21 to a discharge or depositing station at the lower end of conduit 21. It is desirable to have means to control the flow in the blower conduit system. Such flow control involves a cut-off valve which functions to stop the delivery through conduit 21 of air during operation of fan blower 20. Such a valve or gate may be placed either in the intake conduit 19 or in the discharge conduit 21, or in both places. For the purpose of simplifying the description such valve means is illustrated in both places and described with reference to that one which is in the intake conduit 19 wherein such valve is designated 25. Where two or more are used, they are preferably operated together and by the same means. A second one is shown at 25' in the discharge conduit 21.

Figure 2:
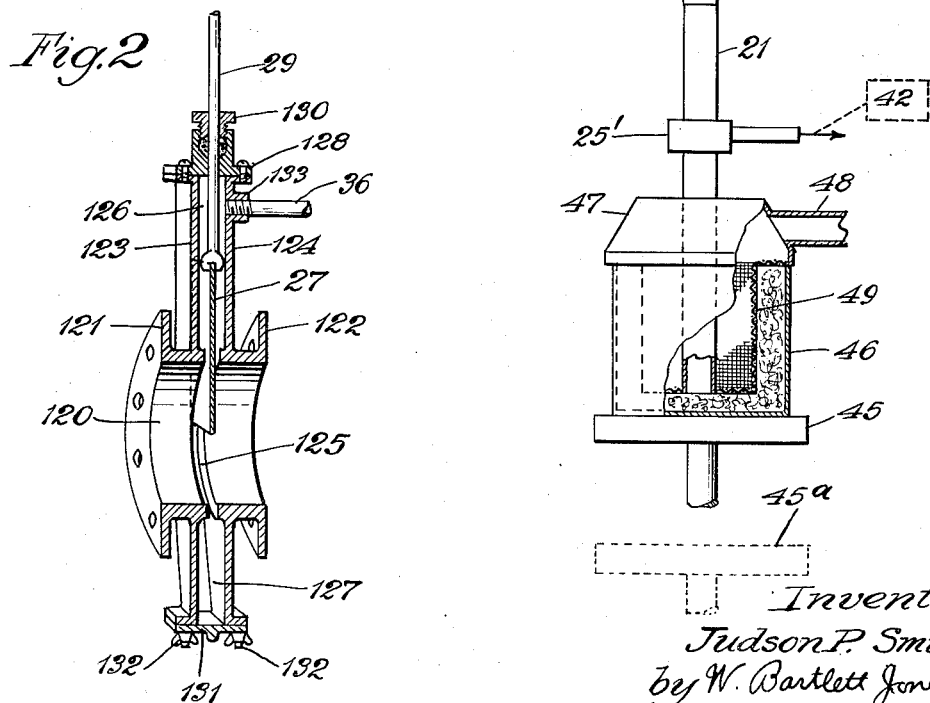
Fig. 2 represents a perspective view partly in cross-section, of a valve according to the present invention for a system such as that in Fig. 1.

The valve 25 contains an important feature of the present invention in that there is connected to the casing for valve 25 a supply of air under pressure greater than that in the functioning conduit 19. The valve is so constructed that when the valve is open and solid material flows through the opened valve, all the spaces and seating areas normally covered by the movable valve member in its closed position are swept by air moving into the conduit, preferably from passageways for air issuing from the valve casing into the conduit space. Thus, the air moving through said spaces and seating areas keeps the solid material from depositing upon the seating areas or from passing through openings into the chambered space of the valve casing from which the air is emitted. The detail of construction of the valve is shown in Fig. 2 and will be later described. Only its general external form is indicated in Fig. 1.

Valve 25 is preferably operated by fluid control, for example, by compressed air. There is a movable gate 27 in the valve casing and a gate-holding chamber 28 outside the valve proper, in which chamber the gate 27 is housed when the gate is in open position. The gate carries an operating stem 29 projecting from the housing 28 and movable into and out of the housing 28 to close and open the gate. The operating stem 29 is connected to a piston rod 30 having a piston head 31 operating in cylinder 32. The two ends of the cylinder 32 each have a connection to a compressed air supply so that by introducing air into the one connection and exhausting it from the other, the piston is moved to operate the gate. Numeral 34 represents the connection for supplying air to close the gate and numeral 35 represents the connection supplying air to open the gate. It is also to be observed that there is a connection 36 between the connection 35 and the gate housing 28 so that when the gate is being opened and is open, an air stream passes through connection 36 into the gate housing and along into the blower system. This air keeps the gateways and seat areas free from fiber and avoids accumulation of fiber in the air spaces of the gate valve where it would eventually impede its proper operation.

Further means for controlling the operation of the gate 27 involve control of the air supply to the cylinder 32. The numeral 38 represents a pipe line supply of air under pressure (greater than that in conduit 19 or 21) as a connection to a control valve housing 39 which housing has discharge outlet 40. The illustrated control valve 39 is merely a conventional representation of any suitable valve for the purpose, and in such representation the diagrammatic rotary valve member 41 is moved to shift the air supply from one to the other of the connections 34 and 35 to the cylinder 32. Diagrammatically represented, the aforesaid connections to the valve housing 39 are arranged 90° apart in the following order, 34, 38, 35 and 40. When the valve element 41 is in the full-line position shown, air pressure acts through connection 34 to hold piston 31 down and hence to hold the gate 27 closed. By turning valve element 41 through 90° to dotted-line position 41a, the supply of air and the exhaust connection are shifted and the piston 31 is moved to open the gate and to hold the gate open. The system involves electrically controlled means to move the valve member 41 from one of its two positions to the other. Such control means is designated by the numeral 42 and has the electrical wires 43 leading to it to energize the device 42 to open gate 27. The device 42 may be a solenoid-operated device controlling the position of valve member 41.

The discharge or filling station may be such as to receive a receptacle to be filled, such as a refrigerator cabinet, and such as to establish operating connection to the cabinet. This is preferably accomplished by moving the receptacle onto a platform section which moves into a connecting position, preferably as a lift. Control means is provided for raising and lowering such a lift to effect connection of the receptacle to suitable fixture means on the end of discharge conduit 21. The lift is preferably operated by fluid pressure, such as pneumatic pressure in suitable means, and such means may be of the type used to raise and lower the gate valve 27. However, such means forms no part of the present invention.

Numeral 45 represents a lift having a platform for a receptacle 46 thereon to be connected to a fixture 47 placed directly above the lift and at the end of conduit 21. Numeral 48 represents a conduit through which air is discharged after having been freed from the fiber or the like deposited in the receptacle, suitable screening or filtering means 49 being operatively associated with the fixture 47 and the receptacle 46. Numeral 45a represents the position of the lift when it is out of operating position, as for example, when it is being loaded with a receptacle to be filled. It is important at this time when the lift 45 is out of indicated full-line position, that the conduit system 19—20—21 be free from fiber and that it not discharge air, nor air and fiber, into the atmosphere when conduit 21 is open to the atmosphere by reason of there being no receptacle 46 in place to receive the fiber. Consequently, it is important under these conditions that there be no feed of fiber 10. It is also important that the feed of fiber be prevented except when the conduit system is open to carry it away and the lift 45 is in raised or receiving position, of course with a receptacle 46 in place.

In the intake conduit 19 there is a lateral duct 19a opening from the atmosphere to the interior of conduit 19. At the end of the lateral duct 19a there is a swinging damper 71 rotating on axis 72, and urged into normal and static position (as shown) by means such as counterweight 73. The arrangement is such that a predetermined degree of suction in duct 19a resulting from movement of air by the blower when the gate 27 is open, draws in the damper against the counterweight 73 thereby operating a control mechanism 70.

The control mechanism 70 is represented as a simple switch box containing a single switch 76 for the two wires 77 and 78 leading to it. Said switch is directly operated to close it by the projecting arm 80 when it moves to dotted-line position 80a. Said arm 80 is connected by a link 81 pivotly secured at its respective extremities to arm 80 and to a stem 82 on the damper 71 which stem carries the counterweight 73. Stem 82 is threaded over a long region designated 84 and the counterweight 73 is threaded thereon in order to adjust the effect of counterweight 73 and predetermine the degree of suction to which it responds.

The numerals 101 and 102 represent electric power lines for operating the lift 45 by means not shown, for operating the valve control means 42, for operating the bale-breaker motor 17, and for operating the motive means 14 to feed fiber 10. Means is provided for placing under manual operation a control for opening gate 27. The control 70 is arranged automatically to effect closure of the gate 27 by de-energizing valve-opening means 42. To simplify the representation of controls, the valve-opening operation is illustrated as initiated by holding down push button switch 103, thereby completing a circuit from line 101 through connection 104, through one or more controls diagrammatically represented at 105 and for the present purposes to be considered as constituting a closure of the circuit from connection 104 to the valve-opening means 42, thence to the junction 106, thence through the push button operated switch 103 to junction 107, and then by connection 108 to the power line 102. By-passing the said push button switch 103, is a solenoid-operated switch 110 between the junctions 106 and 107. Switch 110 is normally open and is closed only when solenoid 111 is energized. Thus, when solenoid 111 is energized the open gate 27 is held open by closure of switch 110, and during this status the push button switch 103 may be opened by the operator. Numeral 112 represents conventional timing means capable of being set to vary the time interval from zero to any predetermined time after de-energizing solenoid 111 to its action to open switch 110, this action being suitably indicated in the drawing.

The energization of solenoid 111 is not intended to open the gate 27 but only to hold it open after it has been opened by manual push button 103. Hence, the effect of having opened the gate 27 is relied upon to energize solenoid 111 and this is accomplished by the suction in duct 19a on opening the gate.

The suction in duct 19a draws in damper 71, and closes switch 76. This energizes solenoid 115 by completing the circuit-power line 102, connection 77, switch 76, connection 78, solenoid 115, and thence to power line 101. Solenoid 115 is employed as a convenient device to cause the suction to perform more than one function. Therefore, by operating the one switch 76, the solenoid 115 extends the effect by operating more switches such as relay switches 116 and 117 which are closed by energizing the solenoid 115 and opened by de-energizing it. Switch 116 is in the circuit from lines 101 and 102 to the feeding motive means 14, so that fiber 10 is fed only when the damper 71 is in its suction-operated position. Switch 117 is in series with solenoid 111 across the lines 101 and 102 so that solenoid 111 is energized only when the damper 71 is in suction-operated position.

Accordingly, as soon as the suction fails, the switch 76 is opened, and the fiber feed 14 is thereby cut-off immediately by opening switch 116. Residual fiber in the system may be cleaned out by delaying closure of the gate 27, as by the adjustment of the timing device 112 to control the time of opening switch 110 after the damper 71 moves to its cut-off position.

The above system is part of a more complex controlled system in which there are other means associated with the parts above described. These form no part of the present invention.

The foregoing parts are pertinent to the operation of the valve 25 and the air supply 36 to it to clean out the valve parts and to maintain the valve in clean condition. Fig. 2 represents one form of valve suitable for the present invention. It shows a valve having two casing parts secured together on a medial plane constituting the path of gate 27. The two parts provide a valve-opening conduit space 120 surrounded by the annular flanged portions 121 and 122. Above the flanged portions 121 and 122 there are sides 123 and 124 which come together to form a chambered space in which the gate 27 rests when the valve is open. Within the conduit space 120 there is a peripheral opening 125 through which the gate moves to close it in closing the valve. Above and below this peripheral space and within the valve casing there are open chamber spaces 126 and 127, respectively, between the two half portions of the valve. A top cap plate 128 is provided through which the gate stem 29 slides through a suitable packing gland 130. At the bottom of the casing the lower space 127 is closed by a bottom cap 131 which is readily removable by taking out the mounting screws 132. Into the chambered space 126—127 of the valve casing, there is a threaded opening 133 for a pipe connection such as air pressure supply line 36 described in Fig. 1.

Thus, when the valve is open, gate 27 is housed largely in the chambered space 126 which space opens into the conduit system through the peripheral area 125, the bounding faces of which are seating areas for the gate 27 in its closed position. When any certain pressure exists in the conduit space 120 of the valve opening, a greater pressure exists in supply line 36 to effect a current of suitable gas, such as air in the described system, continuously from the chambered recesses of the valve casing through peripheral opening 125 into the conduit system. This current of gas effectively keeps solid material from moving into the valve casing, and the gas currents and flow thus effected tend to clean out from the valve casing particles which by some incident pass from the conduit space into the valve casing. Referring now to operation of the device, it is assumed that a receptacle 46 is in the position shown in Fig. 1 to receive fiber. The blower 20 is assumed to be in full operation, and likewise the bale-breaking rotor 15. The valves such as 25 in the conduit system are closed, which means that air pressure passes through valve 39 to connection 34, thus discharging no air into the casing of valve 25. By depressing push button switch 103, the mechanism 42 is energized to shift the valve 39 so that air is supplied through connection 35, thus opening the valve gate 27. At the same time air passes through pipe connection 36 cleaning out the valve and preparing to maintain it in clean condition. Air passes through the blower system until suction operates the damper 71 thereby to close switch 76 and energize solenoid 115. This effects closure of switch 110 through action of solenoid 111 permitting push button switch 103 to be released. The damper also acts through solenoid 115 to close switch 116 and start the feed of fiber into the already established flow of air.

When the receptacle 46 is sufficiently filled so that there is an effective resistance to the flow of air in system 19—20—21, the suction in duct 19a reduces and causes damper 71 to snap back to normal position and thereby open switch 76. This immediately opens switches 116 and 117. Switch 116 stops the feed of fiber. Switch 117 de-energizes relay having solenoid 111, and according to its setting predetermines instant or delayed opening of the switch 110. When switch 110 opens it de-energizes valve-operating mechanism 42, and shifts the supply of air from connection 35 to line 34. This causes valve gate 27 to close. The delayed action for closing the valve is preferred in order thereby to maintain flow of air, although diminished by resistance at the filling station, in conduit 19, and continued supply of air to valve-cleaning connection 36 for a short period after the feed of fiber 10 has stopped. This time period allows the system to be purged of fiber in the vicinity of valve 25 so that when the gate 27 closes the valve is clean and fibers are not present to enter the valve casing in the absence of air supply in connection 36 during the closing action.

From the foregoing description and explanation, it is obvious that a valve of any type having a gas supply into its casing for cleaning the valve seat, may be used in many systems for the conveyance of solids in gas, such as powders, grain, coal, sand and the like. The operation of the valve and the control of the gas supply for cleaning the valve may be integrated into any overall-control for the system embodying the valve. Hence, the particular relationships of the parts and the controls herein described are not to be considered as limitations of the invention short of its scope as set forth in the appended claims.

I claim:

1. Apparatus for conveying solid material in gaseous suspension comprising a conduit arranged for the conveyance of a gaseous suspension of solid material, a valve casing in said conduit having one or more of seating areas for a movable valve member, a movable valve member arranged when in open position to expose said seating areas to solid material being conveyed in said conduit, and means arranged and controlled to provide a supply of gas under pressure greater than that in the conduit in the open position of the valve through said valve casing and past said areas when the valve member is in open position into the conduit whereby the resulting moving stream of gas sweeps solid material away from the said seating areas.

2. Apparatus for conveying solid material in gaseous suspension comprising a conduit arranged for the conveyance of a gaseous suspension of solid material, a valve casing in said conduit having one or more of seating areas for a movable valve member, a movable valve member arranged when in open position to expose said seating areas to solid material being conveyed in said conduit, means arranged and controlled to provide a supply of gas under pressure greater than that in the conduit in the open position of the valve through said valve casing and past said areas when the valve member is in open position into the conduit whereby the resulting moving stream of gas sweeps solid material away from the said seating areas, and means associated with the valve member and arranged automatically to cause the admission of said gas to said casing when the valve member is in open position.

3. Apparatus for conveying solid material in gaseous suspension comprising a conduit arranged for the conveyance of a gaseous suspension of solid material, a valve casing in said conduit having one or more of seating areas for a movable valve member, a movable valve member arranged when in open position to expose said seating areas to solid materials being conveyed in said conduit, means arranged and controlled to provide a supply of gas under pressure greater than that in the conduit in the open position of the valve through said valve casing and past said areas when the valve member is in open position into the conduit whereby the resulting moving stream of gas sweeps solid material away from the said seating areas, and means arranged for operation both to open and close said valve member, said gas supply to said casing being associated with said valve-operating means and thereby arranged to admit gas to said valve casing when said valve is in open position.

4. Apparatus for conveying solid material in gaseous suspension comprising a conduit arranged for the conveyance of a gaseous suspension of solid material, a gate-valve casing in said conduit having a chamber space in the casing extending peripherally around and communicating to the conduit space by a peripheral opening which is open and closed respectively when said gate valve is open and closed, a gate slidable in said opening and arranged to close communication between said chamber space and said conduit space when said gate is in closed position, and means arranged and controlled to provide a supply of gas at a pressure greater than that in the conduit in the open position of the gate through said casing and past said seat and opening for discharge into said conduit and thereby to resist entry of solid material into the path of the gate.

5. Apparatus for conveying solid material in gaseous suspension comprising a conduit arranged for the conveyance of a gaseous suspension of solid material, a gate-valve casing in said conduit having a chamber space in the casing extending peripherally around and communicating to the conduit space by a peripheral opening which is open and closed respectively when said gate valve is open and closed, a gate slidable in said opening and arranged to close communication between said chamber space and said conduit space when said gate is in closed position, and means arranged and controlled to provide a supply of gas at a pressure greater than that in the conduit in the open position of the gate through said casing and past said seat and opening for discharge into said conduit and thereby to resist entry of solid material into the path of the gate, and means associated with the gate and arranged automatically to cause the admission of said gas to the casing when the gate is in open position.

6. Apparatus for conveying solid material in gaseous suspension comprising a conduit arranged for the conveyance of a gaseous suspension of solid material, a gate-valve-casing in said conduit having a chamber space in the casing extending peripherally around and communicating to the conduit space by a peripheral opening which is open and closed respectively when said gate valve is open and closed, a gate slidable in said opening and arranged to close communication between said chamber space and said conduit space when said gate is in closed position, and means arranged and controlled to provide a supply of gas at a pressure greater than that in the conduit in the open position of the gate through said casing and past said seat and opening for discharge into said conduit and thereby to resist entry of solid material into the path of the gate, a pneumatic cylinder for opening and closing the gate, a piston movable in said cylinder and connected to the valve member for operating said gate, a supply of gas under pressure connectable alternatively to either one end or the other of said cylinder whereby to move the gate and to hold the gate in open or closed position, said gas supply to the valve casing being connected for operation when the said cylinder is supplied to open the valve.

7. Apparatus for conveying solid material in gaseous suspension comprising in combination a conduit for conveying solid material suspended in moving gas, a valve in said conduit having a casing and a valve member movable to open and closed positions, a supply of gas under pressure greater than that in the conduit when said valve is open, said supply being connected to said valve casing and arranged to discharge therefrom into the conduit space in a manner to clear the path of the valve member of solid material during the open position of the valve.

8. Apparatus for conveying solid material in gaseous suspension comprising in combination a conduit for conveying solid material suspended in moving gas, a valve in said conduit having a casing and a valve member movable to open and closed positions, a supply of gas under pressure greater than that in the conduit when said valve is open, said supply being connetced to said valve casing and arranged to discharge from the valve casing into the conduit space in a manner to clear the path of the valve member of solid material during the open position of the valve, means arranged to move the valve member and hold it in open or closed position by pressure of said gas supply said supply of gas to the casing being associated with said means to deliver gas when said means operates to open and hold open the valve member.

9. Apparatus for conveying solid material in gaseous suspension comprising in combination a conduit for conveying solid material suspended in moving gas, a valve in said conduit having a casing and a valve member movable to open and closed positions, a supply of gas under pressure greater than that in the conduit when said valve is open, controlled means to open and hold open the valve member, and means associated with said controlled means to connect said gas supply to the valve casing and into the conduit space in a manner to clear the path of the valve member of solid material during the open position of the valve.

10. A conveying system comprising in combination a fan blower, a conduit system connected to said fan blower for conveying solid material into said conduit system for suspension and conveyance therein, feeding means for introducing said solid material into said system, a valve in said conduit through which said suspension passes, said valve comprising a valve gate movable to open and closed positions and a valve casing having a chamber space therein communicating with the conduit space in the open position of the gate and cut off from the conduit space in the closed position of the gate, a pneumatic cylinder for moving the gate and for holding it in open and closed position, a piston movable in said cylinder and connected to said gate for operating the gate, a supply of air under pressure greater than that in the conduit system in the open position of the valve, means for alternatively connecting said air supply to one or the other end of the cylinder to move the gate and to hold it in open or closed position, means connecting said air supply to the chamber space in said casing when the valve is opening and is open, control means arranged to operate the feeding means to supply solid material to said conduit system only when the gate is open and during operation of the blower and operable to stop the supply of solid to said conduit system while said gate is open whereby said gate may be moved from open to closed position when no solid is being conveyed through the valve.

JUDSON P. SMITH.

REFERENCES CITED

The following references are of record in the file of this patent:

UNITED STATES PATENTS

| Number | Name | Date |
|---|---|---|
| 941,024 | Mantius | Nov. 23, 1909 |
| 1,789,692 | Rosencrants | Jan. 20, 1931 |